Dec. 24, 1968
L. L. YOUNG
3,418,507
GASEOUS, ARC-RADIATION SOURCE WITH ELECTRODES, RADIATION
WINDOW, AND SPECULAR FOCUS ALIGNED ON THE SAME AXIS
Filed Jan. 20, 1966
3 Sheets-Sheet 1
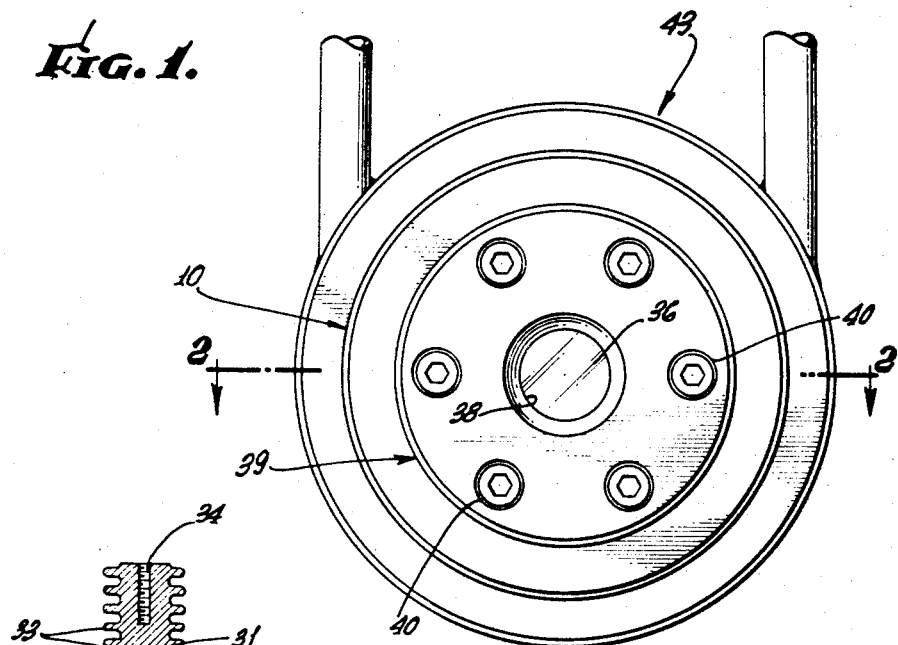
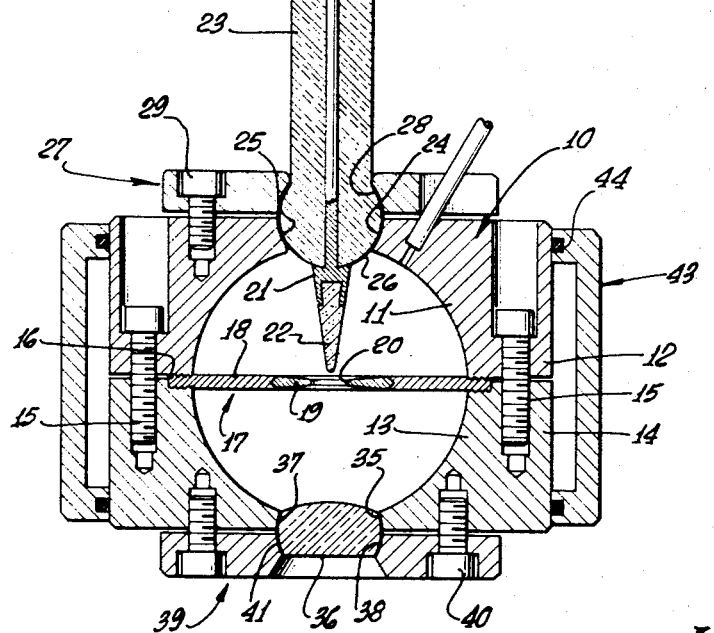
INVENTOR.
LARRY L. YOUNG
BY White & Haefliger
ATTORNEYS.

Dec. 24, 1968   L. L. YOUNG   3,418,507
GASEOUS, ARC-RADIATION SOURCE WITH ELECTRODES, RADIATION
WINDOW, AND SPECULAR FOCUS ALIGNED ON THE SAME AXIS
Filed Jan. 20, 1966   3 Sheets-Sheet 2

INVENTOR.
LARRY L. YOUNG
By White & Haefliger
ATTORNEYS.

Dec. 24, 1968    L. L. YOUNG    3,418,507
GASEOUS, ARC-RADIATION SOURCE WITH ELECTRODES, RADIATION
WINDOW, AND SPECULAR FOCUS ALIGNED ON THE SAME AXIS
Filed Jan. 20, 1966    3 Sheets-Sheet 3
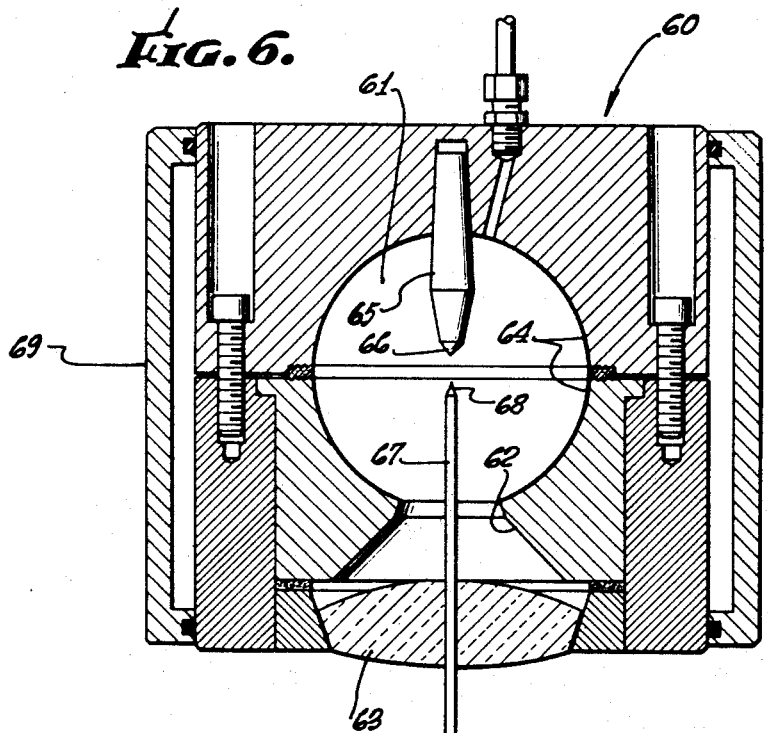
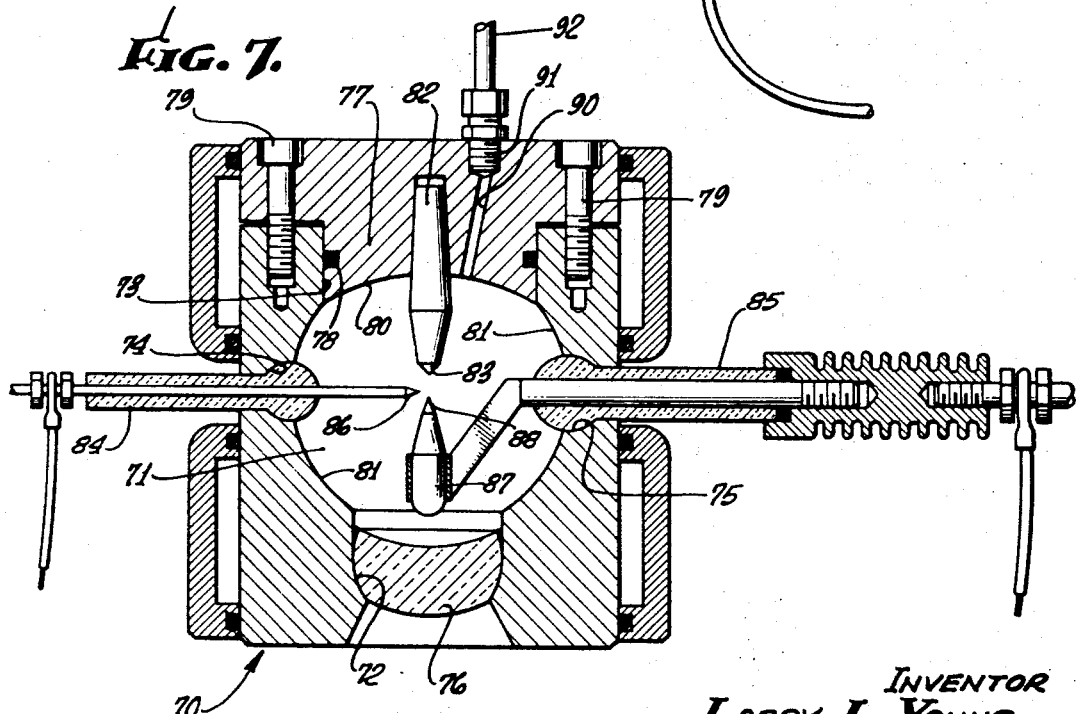
INVENTOR
LARRY L. YOUNG
By White & Haefliger
ATTORNEYS.

ns3,418,507
Patented Dec. 24, 1968

3,418,507
GASEOUS, ARC-RADIATION SOURCE WITH ELECTRODES, RADIATION WINDOW, AND SPECULAR FOCUS ALIGNED ON THE SAME AXIS
Larry L. Young, P.O. Box 308,
Dana Point, Calif. 92629
Filed Jan. 20, 1966, Ser. No. 521,874
8 Claims. (Cl. 313—18)

ABSTRACT OF THE DISCLOSURE

The invention concerns a gaseous arc-projector, means to produce a high pressure gaseous arc, and integral radiation reflecting means, wherein self irradiation features spectrally and spacially modify and increase radiance of the intrinsic arc, and reflecting and refracting menas operative in such manner that radiation from the arc is transferred to produce spacially controlled and spectrally modified irradiation of an external conjugate surface.

---

This invention relates to a source of high intensity electromagnetic radiation at or near the light frequency spectrum and in particular to a source in which radiation directing means and radiation generating means are integral to one physical configuration and cooperate to provide extra high effective radiance and extra high efficiency of radiation utilization in projection.

The primary objective of the invention is to provide high irradiance in a controlled pattern at the optical image conjugate to the intrinsic source, where this controlled high irradiance at the image is enabled by three prime characteristics of the means herein provided, namely; radiance enhancement of the intrinsic source, a fast relatively aberration-free optical system and an optical train of minimum complexity which is therefore relatively lossless. Another objective is the spectral control of irradiance in the projected image.

Further objectives of the invention are: to provide a radiation projection system which is compact, rugged and free of hazard to operating personnel, which is demountable and can be repaired and restored to original performance after extended use and which is versatile and flexible in its operating parameters as may be desirable as a research or process apparatus.

Advantages of this invention my be described in comparison with previously available means. Typical radiation projection systems are usually comprised of an assemblage of distinct and separable components such as, for example, a primary radiation source in the form of an open arc or an enclosed gaseous arc sealed in a glass-like envelope, a combination of mirrors and lenses designed to collect and direct the radiation that is produced by the source and to direct it to the image receiving means. To overcome the limitations of available sources some such systems have resorted to the expedient of parallel or multiple source systems with combining optical means which become very complex, very expensive and very inefficient. The means provided in this invention, to be described in detail below, are a radical departure from conventional design and construction. Here a source of radiation such as a gaseous arc operating under high pressure is principally contained in a metal envelope which can safely withstand the pressure; with a window at or beyond an aperture in the metal envelope which seals the cavity and is precision designed and fabricated of suitable material to efficiently transmit and direct radiation and also withstand the pressure and heat loading. Prototype versions of this basic design have been successfully operated at input power in excess of ten kilowatts with overall performance efficiency superior to conventional systems employing as much as thirty kilowatts of input power. The design configuration furthermore is not limited to such continuous power versions as ten kilowatts, but may be scaled up to considerably higher powered versions. A current study for a system with a suggested input power of one megawatt has been sponsored by a government space agency. We propose to provide the required performance in a single system in accordance with this invention with input power of three hundred kilowatts.

Typical radiation projection systems exhibit low efficiency in terms of the fraction of the radiant energy that is actually projected. A normal figure for the efficiency is in the range of one to four percent. This low efficiency is due to several factors; including the low average radiance of the intrinsic source, the collection efficiency of the optical system, the necessity for subtractive filter systems to modify the spectral composition and of complex optical trains required to combine radiation from multiple sources and to achieve a desired spatial pattern in projection.

A need exists for a light source of improved stability, brightness and uniformity for such uses as light sources for projectors and film printers and high intensity radiation sources for solar simulation and materials and process applications. An example of the identification of such a need will be found in an article entitled, "A Uniform Blackbody Light Source Excited by Radio Frequency" by Sanford C. Peek in the December 1955 Journal of the SMPTE (volume 64).

Efforts to improve irradiation from high intensity sources have been confined mainly to attempts to increase the radiant power of the source. Substantial improvements over filament-type sources have been attained with short arc gaseous lamps that operate at modestly high pressure. Two characteristics of the sources have been improved; the radiance and the radiant intensity. It has been found that even such improved sources cannot be effectively utilized and systems employing them still do not achieve the levels of irradiation required for applications such as those for solar simulation and the like.

Systems employing conventional arc sources are characterized by several other problems, in particular the problems of spectral composition, of aberration associated with the use of deep ellipsoidal mirrors in the collection and distribution system, and of sufficient "speed" in the optical train. The spectral composition of conventional sources is relatively uncontrolled, except by the use of filters which attenuate unwanted portions of the spectrum. Such subtractive procedures reduce the radiant energy delivered to the image-receiving means. Ellipsoidal mirrors are used as a conventional means of light collection and delivery, with the primary source at one focus and the image-receiving means at the other. Such a procedure forms an optical system with a variable magnification characteristic which changes from the center toward the periphery of the mirror and therefore degrades the projected image. It is apparently not possible to design a sufficiently "fast" optical system to collect and direct a major fraction of emitted radiation from an arc (which does have appreciable dimensions) without gross aberration that is the result of use of deep ellipsoidal mirror procedures.

Attempts have been made to obtain desired performance by the use of complex lens systems interposed between the source and the image-receiving means. In a more extreme case, images of more than one source have been superimposed by lens systems. Such complex optical systems induce significant optical impedance mismatches into the system and degrade the efficiency of irradiation.

This invention provides a high-wattage, highly efficient radiant source in an integral, compact and rugged unit.

The high-wattage capability is in part a result of improved thermal control. The efficiency is in part due to departure from the use of ellipsoidal mirror systems, in part due to thermal control of the primary radiant source by an energy feed-back procedure, and in part to extreme simplification in the optical train.

The conventional design of prior arc lamps does not permit substantial heat removal from the electrodes except by radiation. This in turn requires electrodes of sufficient area for this heat emission, and requires anode operation at temperatures much higher than those of the lamp envelope. Vitreous silica envelopes are conventional, and even with this material, there is considerable radiation absorption beyond a wavelength of three microns, a spectral region which receives much of its supply from the heated electrodes. This heat load is sufficient to limit the gas pressure within the envelope or to require enlargement of the dimensions of the envelope. Envelope temperatures can become so high that long lead-in wires are needed to place the envelope-to-metal seal at a location thermally remote from the incandescent electrodes. The large current required to operate the arc thus results in a significant power loss in the long lead-in.

The present invention improves upon the performance and efficiency of projection systems by providing means for directing the radiation which are integral with the radiation generating source envelope. Basically, the invention comprises means including electrodes extending in such proximity as to form a gap to pass electrical current through an ionized gas providing an arc source of electromagnetic radiation, a body having a cavity containing the gap and reflector means extending about and facing the gap in such spaced relation as to image the radiation from the source back toward the source to enhance the intrinsic radiation thereof, and the body having an outlet through it to pass a portion of the enhanced radiation from the interior to the exterior of the body while allowing the cavity to be maintained at high pressure with a selected gas if this is desired for the particular use.

The cavity within the body includes a spherical portion, the interior surface of which has a specular reflecting surface extending over at least one-half of the surface area of the interior of the cavity. This spherical portion is approximately concentric with the primary radiation source within the cavity, and serves to image the source back upon itself. Radiation is delivered from the cavity through a transparent portion of the body containing a lens. In one version the lens cooperates with a mirror within the cavity to project a collimated train of radiation.

The reflecting spherical surfaces of the cavity are obtained in any of several processes; in a preferred method, the spherical contour is accurately machined to a fine finish, the surface is lapped and polished and may then be provided with a coating of highly reflective material by the vacuum deposition method. In one prototype version a copper body was machined then plated with electroless nickel. The nickel was lapped and polished then coated with aluminum by vacuum deposition. Silicon monoxide was then coated on by vacuum deposition as a protective layer. In another prototype aluminum alloy No. 6061 has been used for the body of the envelope. The interior surface was machined to a spherical surface, then buffed to a high polish. Such an accurately machined surface has also been lapped to a high polish with aluminum oxide abrasive, water and detergent using a besswax lap. Here it has been found important to control the pH and lubricating condition with the addition of just sufficient detergent solution to allow the abrasive to adhere to the beeswax lap. A commercial vehicle containing six-micron diamond powder also worked well in producing a highly polished surface. Cerium oxide and other compounds have been recommended to us but have not been found to work very well.

The aluminum alloy polished surface develops a thin layer of oxide upon exposure to the atmosphere which seems to offer some protection to the polished surface.

It is contemplated that the reflecting surface may be produced by plating on silver followed by a lapping or buffing operation. Such a reflecting surface is expected to perform well in applications requiring the projection of visible or infrared radiation. More exotic type reflecting surfaces of the multiple thin film variety for control of spectral composition are of course also contemplated.

Preferably, the invention involves the use of a short arc gaseous discharge source surrounded by a spherical envelope. The cavity which contains this arc is normally pressurized with an inert gas or metallic vapor or with combinations of such gases and vapors, as exemplified by argon, xenon, and mercury vapor. Depending upon the requirements for the source, the pressure within the envelope may be from near-atmospheric to hundreds of atmopsheres.

Such a source is characterized by several outstanding advantages including increase in radiance, increase of radiant intensity, control of spectral composition and of spatial irradiation. Improvement or control of these characteristics is achieved by the unique construction of the source and the integral optics. Due to characteristics of the spherical envelope, a substantial part of the energy represented by the radiation generated by the source is directed through a relatively small portion of the envelope. This makes it possible for the remainder of the envelope to be constructed of opaque materials of high tensile strength, a material capable of being subjected to internal pressures substantially higher than those which may be used for envelopes primarily constructed of glasslike materials. The capability to use higher gas pressures enables the achievement of higher intrinsic radiance by the arc. This capability to use higher pressures also provides a means of control and of modification of the spectral composition of the delivered radiation.

At the increased pressures made possible by this invention, higher current density and higher intrinsic radiance are obtained in the arc. These results are achieved with an envelope made of metal having high thermal conductivity, adequate tensile strength, and a reasonably low coefficient of thermal expansion. The internal surfaces of the envelope are prevented from reaching excessive temperatures by the use of forced cooling which in turn utilizes the thermal conductivity of the envelope material. Excellent thermal paths to the forced cooled envelope are also provided from the electrodes. In particular the anode which receives considerable heat from electrons from the arc is provided a direct thermal conduction path to the massive metal envelope. Such an ample conduction path permits a high wattage arc to be maintained without appreciable vaporization or erosion of the anode tip as would occur with excessive temperature in the anode. The relatively small aperture in the metal envelope that is required for delivery of the radiation permits use of a precision fabricated optical element of relatively expensive material such as sapphire. Sapphire is preferred because it has better transmission properties and higher strength at higher temperatures than vitreous silica.

The metal envelope also contains a small channel to permit vacuum pumping for flushing and regulated filling of the envelope with a suitable gas at the pressure desired for the particular operation. This filling channel also allows the gas pressure in the envelope to be adjusted for starting the arc and for its later operation. As an illustration in one test of a prototype, it was started at 35 atmospheres and run at 70 atmospheres, and in another test of another prototype it was started at less than two atmospheres and run at forty atmospheres.

These illustrations demonstrate the adjustment and maintenance of the gas pressure within the envelope through the use of external regulating supplies communicating with the interior of the envelope through the filling channel. Many conventional vitreous silica envelope high-wattage lamps have become useless because the filling gas has escaped through slow leaks in the seal. The filling channel in this invention overcomes this disadvantage while increasing the control available to the operator by permitting the gas pressure to be adjusted and maintained within the envelope.

This invention has the capability of operating over a wide range of pressures, as noted above. It also has the capability of operation over a substantially broader range of source temperatures than the conventional sources. Spectral composition of the output radiation may be controlled through the independent control of the pressure and of the arc temperature. The pressure is controlled through control of the pressure in equilibrium with the arc cavity through the fiilling channel. The temperature is controlled through control of the electrical parameters of the arc source.

In addition, the repeated self-irradiation of the arc by means of the concentric reflective surface provides spatial and electrical stabilization of the source. Improved stability in this aspect leads to an improvement in radiant efficiency and as well to an improvement in radiation direction capability. A high temperature arc plasma core that is the effective source of radiant emission tends to center itself within the reflecting spherical surface and to become uniform in temperature.

These and other advantages of the invention will become more apparent by reference to the following figures, in which:

FIG. 1 is a bottom end view of the radiation system according to the present invention.

FIG. 2 is a sectional view taken along line 2—2 of FIG. 1.

FIG. 6 is a schematic sectional view of a radiation system in which the cathode is supported by and powered by an electrical lead through the lens which is in the aperture.

FIG. 7 is a sectional view of an alternate embodiment of a radiation system according to the present invention with a compound concentric catadioptric system, an anode, a cathode and a starter electrode.

Figure 3:
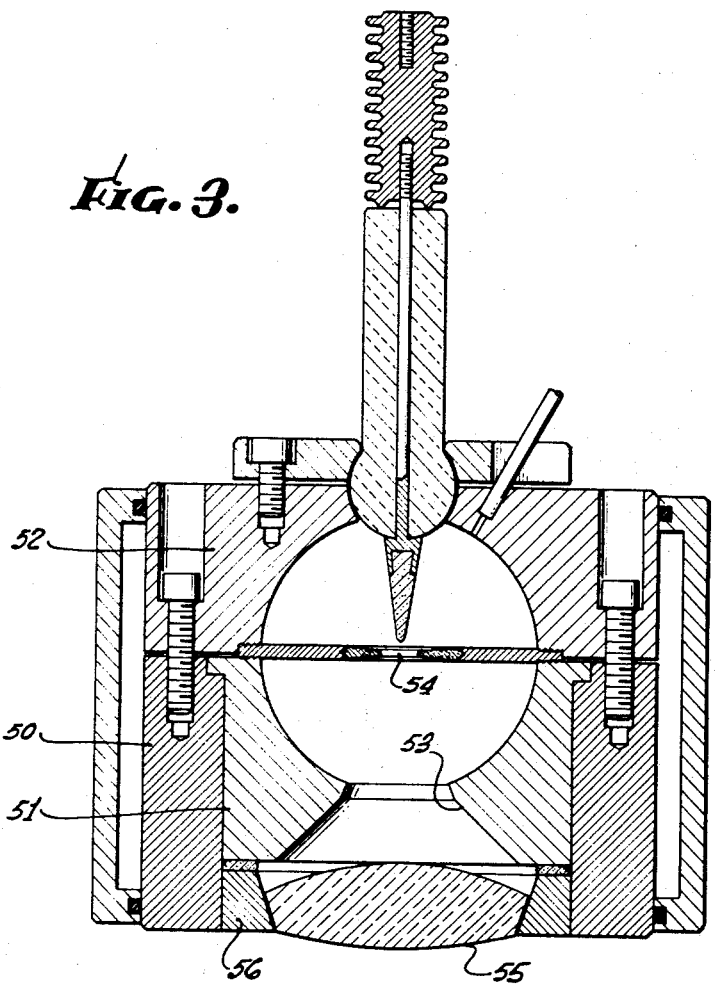
FIG. 3 is a sectional view of an alternate configuration according to the present invention in which the aperature is separate from the lens.

The detailed relationships of the electrodes, aperture, and envelope in one embodiment of the invention are shown in FIGS. 1 and 2. A hollow body such as a spherical envelope 10 consisting of a first hemisphere section 11 provided with an outward annular extension 12 is joined to a second hemisphere section 13 provided with a similar extension 14 by bolts 15 passing through the extension. The hemispheres 11 and 13 are hermetically sealed to each other by being clamped against a gasket 16 material such as a serrated annealed coppr annular disk 17. As shown the peripheral area of one anode 18 may be serrated to serve as a gasket. Together, the two hemispheres comprise a massive metal envelope constructed of hard copper, aluminum or alloys of those materials or other materials having good thermal conductivity, good tensile strength and low coefficient of temperature expansion.

The anode 18 is constructed of copper except at the center 19 which is a tungsten insert having a central aperture 20. The anode is thermally and electrically grounded to the metal envelope and the positive terminal of the electrical power supply (not shown) is connected electrically to the envelope. The cathode 21 is constructed of copper except at the tip 22 which is a tungsten insert press-fitted or brazed to the copper leadthrough. Each electrode consists of a main body 18, 21 of material such as oxygen-free high conductivity copper for maximum thermal and electrical conductivity, which is tungsten tipped where the electrodes form an arc gap. Electrical insulation is provided the cathode only by the insulator 23. The insulator has been fabricated from alumina, beryllia, and boron nitride; each material having been used successfully.

Hemisphere 11 contains an aperture 24 which is ground to a spherical contour seat 25 to receive the spherical boss 26 of equal radius on insulator 23. A hold-down plate 27 containing a similar ground seat 28 is fastened to hemisphere 11 with bolts 29. The pressure on the insulator obtained in clamping effects a satisfactory seal of the insulator in the aperture. The cathode leadthrough terminates in a screw thread 30 on which a cap 31 is fastened. The cap serves the multipurpose when tightened down, of sealing the slight gas passage between the leadthrough and the inside of the insulator, of radiating heat, and of providing an electrical terminal to which the negative terminal of the power supply is connected. For these purposes it is constructed of soft copper, has a narrow flange 32 machined on the lower end which presses against the insulator, has a series of machined fins 33 on the external cylindrical portion, and a screw fitting 34 blind tapped in its upper portion.

An aperture 35 is similarly provided centered on the axis of symmetry of hemisphere 13 by means of which radiation generated at the center of the cavity is transmitted to the exterior of the envelope. As shown, the shape of this aperture is circular to accept a circular window lens 36. Since the source is operated at high-pressure, the transmitting aperture has been designed to subject the lens structure principally to compressive stresses rather than tensile or shear stresses, as glass-like materials can only support high stresses of the compressive kind. Too, it is desired to effect a good thermal path between the lens body and the metal structure to allow heat to leave the lens body. In its preferred form the material provided as the lens is vitreous silica or sapphire, each having wide spectrum transmissive characteristics, as well as other desirable properties. Vitreous silica is especially tolerant to heat shock due to its low coefficient of thermal expansion, and sapphire can tolerate very high temperatures. Accordingly the aperture seat 37 is ground to a spherical shape and is lapped to receive the lens body 36 of equal radius. By virtue of this particular configuration the high pressure within the envelope compresses the window against its spherical seat 37 in the body of the envelope and to the spherical seat 38 in the hold-down plate 39 which is bolted to hemisphere 10 with bolts 40. A satisfactory pressure seal is effected and much of the lens body surface is held in intimate thermal contact with the metal structure.

Several variations on the same basic structure have been used successfully; a soft copper serrated gasket 41 has been used where the cavity body was of aluminum alloy, the lapped seats 35, 37 have been gold plated, the seating area of the lens 42 has been coated with gold or with tetrafluoroethylene.

For continuous operation it has been found necessary to force cool the exterior of the envelope structure. For this purpose a water jacket 43 provided with O-ring 44 water seals was slipped over the cylindrical portion of the envelope structure. Water under pressure flowing at the rate of approximately ½ gallon per minute through the jacket was raised approximately 10 degrees centigrade in temperature when the source was operated at approximately two kilowatts of input power.

In FIG. 3, a variation on the embodiment of the system depicted in FIG. 2 is shown. In this illustration, a cylindrical extension 50 holds hemisphere 51 and provides the means whereby the lens is mounted. The extension 50 is joined to the hemisphere 52 as previously described. With the separation of the lens function from the aperture 53 the aperture need not be of circular contour but may assume a rectangular format or any of several other aperture formats including that of disconnected multiple apertures. The hemisphere 51 as well as the hemisphere 52 are provided with concentric mirror or reflective surfaces as before; but in this instance, the aperture 53 in hemisphere 51 is not sealed with a lens but rather opens into the interior of cylindrical extension 50. Radiation originating at the arc 54 passes through aperture 53 and down the interior of the extension opposite the arc 54, lens 55 is mounted in a ring 56 of a ceramic, or metal such as an alloy of nickel (28%), cobalt (17%) and iron (balance), or other material which is thermally covariant with the lens refractory material. In this way, the pressure seal is maintained since the lens and seat in which it is mounted are subject to the same rates of contraction and expansion under the influence of heat generated by the source. The ring 56 is conically ground or spherically lapped so that the lens 55 is mounted in the compression mode therewithin.

Figure 4:
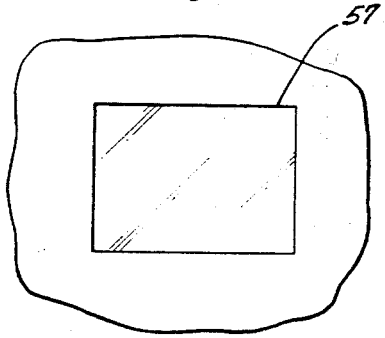
FIG. 4 is a cross-section view of the aperture in a preferred embodiment of the present invention.

Referring to FIG. 4, an enlarged partial cross-sectional view through the aperture such as to pass a rectangular 57 sectioned radiation beam from the arc is provided in one alternative preferred embodiment of the present invention. Here that radiation which falls outside the aperture which defines a rectangular cross-sectioned radiation train is reflected back to the arc enhancing its radiance.

Figure 5:
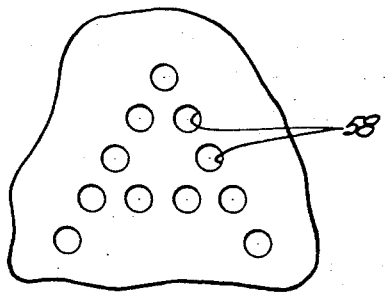
FIG. 5 is a cross-section view of an alternative embodiment according to the present invention which is provided with multiple apertures.

In FIG. 5 is shown an enlarged partial cross-sectioned view of an aperture with multiple openings 58 arranged to form the letter "A" which is representative of any arbitrary radiation passing aperture which might be used including alpha-numeric symbols.

Referring to FIG. 6, a cylindrical metal body 60 with high thermal conductivity, say copper alloy, or aluminum alloy, has a spherical cavity 61 with an aperture 62 over which a lens 63 is sealed. The interior surface of the spherical cavity is coated with a suitable specularly reflective material 64. As with the other configurations described above, the aperture area is substantially less than one-half the interior surface area of the cavity. An anode 65 is sealed in the block 60 in direct electrical and thermal contact with it. The interior end of the anode is tapered to a tip 66 which terminates adjacent the center of the spherical cavity. An electrically insulated cathode 67 is sealed through the center of the lens and terminates at its inner end in a tapered tip 68 adjacent the anode tip to form an arc gap. A cooling coil 69 is welded to the metal body 60. With this configuration the window serves the multiple purposes of insulating the cathode, sealing the envelope and providing an aperture lens for transmitting and refracting radiation.

Referring to FIG. 7, a main body 7 of metal with the requisite thermal conductivity and strength requirements, as previously described, has a hyperhemispherical cavity 71 containing four apertures 72, 73, 74, 75. On the lower axis of symmetry a spherical seat is centered to form a circular aperture 72 in which is sealed a corrector lens 76. On the upper axis of symmetry a larger cylindrical aperture 73 is centered to receive a cylindrical section 77 grooved for and mounting O-ring 78, said section 77 being held in body 70 by screws 79. The inward facing surface of section 77 has a spherical surface 80 of greater radius of curvature than the spherical surface 81 of the cavity 71. Both spherical surfaces 80 and 81 are lapped and polished and/or coated to provide a specular surface of high reflectance. Each mirror surface typically has an area substantially greater than the area of the aperture 72 and surface 81 typically subtends a solid angle from the center of the cavity of greater than two pi steradians. The mirror surface 80 will typically subtend a solid angle from the center of approximately pi steradians. An anode 82 is imbedded directly in section 77 on the principle axis of symmetry and extends to a tapered tip 83 of tungsten which approaches the center of the cavity. The anode is particularly well connected thermally to the massive metal section 77 as well as directly connected electrically. Centered on the transverse axis through the center of the cavity are two apertures 74 and 75 mounting insulators 84 and 85 respectively through which are respectively introduced a starting electrode 86 and the cathode 87. The cathode tip 88 lies on the principal axis of symmetry in colinear relation with the anode facing the anode to form a short arc gap. The tip of the cathode 88 is typically more sharply tapered than the tip of the anode, terminates in a rounded tip of shorter radius of curvature than the anode tip and lies even closer to the center of the cavity. The so-called cathode stabilized arc core just off the cathode is adjusted to a position at the center of the cavity 71.

A channel passage 90 through the member 77 opening into cavity 71 is provided for the purpose of vacuum pumping and pressurizing the system with a suitable gas. The member 77 is accordingly equipped with a pipe thread 91 at the outer terminus of channel 90 to receive appropriate pipe fitting 92. Copper tube 92 serves to connect the system to appropriate gaseous pumping or supply systems (not shown). The copper tube has also been used as the electrical connection to the anode.

I claim:

1. A source of electromagnetic radiation comprising a hollow envelope with an interior spherical specular surface over more than one-half the surface area of the interior of the envelope, a first electrode sealed in the envelope and terminating in a tip in the vicinity of the central portion of the envelope, an aperture in the envelope, the area of the aperture being substantially less than one-half of the interior surface area of the envelope, a solid window transparent to the radiation sealed in the aperture, a second electrode projecting centrally through the window and aperture and terminating in a tip proximate the first electrode tip to form an arc gap, and gas under pressure within the envelope, said electrodes, said window and said aperture defining a common axis, the first electrode projecting in heat transfer contact with the envelope, said electrodes being free of internal fluid coolant passages within the envelope, the window mounting the second electrode.

2. The combination as defined in claim 1 in which said window has an overall diameter normal to said axis at least about as large as the radius of said surface.

3. The combination as defined in claim 1, in which the first electrode has a cross sectional area proximate the envelope that is in excess of the cross sectional area of the second electrode proximate the aperture.

4. Apparatus according to claim 1 in which the envelope contains a gas passage therethrough to communicate with said hollow interior, and the envelope is cup shaped about the aperture to support the window against pressure induced displacement relatively away from said electrodes.

5. A source of electromagnetic radiation comprising a hollow envelope having two separate interior spherical specular surfaces extending over more than one-half the interior surface area of the envelope, having separate centers and different radii, two electrodes extending within the envelope, the inner ends of the electrodes being spaced apart to form an arc gap, at least one of the electrodes being adapted to be connected to a source of electrical power to generate a luminous-concentrated plasma in the gap between the electrodes, the envelope having an aperture and one spherical specular surface having a center of curvature at the gap and the other having a center of curvature lying between the gap and the aperture, and a solid window transparent to radiation from the plasma sealed in the aperture, the electrodes, said window, said aperture, and said surfaces defining a common axis, one electrode projecting centrally through the plane defined by said other surface and in heat transfer contact with the envelope, said other surface subtending a solid angle from said center of curvature of the one surface of at least about one pi steradian.

6. In apparatus of the character described, means including electrodes extending in such proximity as to form a gap to pass electrical current providing an arc source of electromagnetic radiation, a body having a cavity containing said gap and reflector means extending about and facing said gap in spaced relation thereto for imaging radiation from the source back toward the source to enhance the intrinsic radiation thereof, and the body having an outlet at one side thereof to pass enhanced radiation from the interior toward the exterior of the cavity, said electrodes, gap, and reflector means defining a common axis passing centrally through said outlet, said electrodes being free of internal fluid coolant passages within the cavity, one of said electrodes having a terminal embedded in the body.

7. The combination as defined in claim 6 including a light transmitting member at said outlet, and gas contained in the cavity at elevated pressure to provide a gaseous arc between said electrodes, the member supported to be placed in compression by the gas pressure in the cavity.

8. The combination as defined in claim 6 including means outside said cavity to pass fluid in cooling relation to said body.

References Cited

UNITED STATES PATENTS

| | | | |
|---|---|---|---|
| 2,004,680 | 6/1935 | Volmer | 313—332 X |
| 2,372,867 | 4/1945 | Tognola | 313—137 X |
| 3,017,452 | 1/1962 | Rongved | 174—50.61 X |
| 3,024,300 | 3/1962 | Martin | 174—50.61 |
| 3,280,360 | 10/1966 | Frost et al. | 313—231 |
| 3,292,028 | 12/1966 | Van Ornum | 313—231 X |
| 3,304,457 | 2/1967 | Mastrup | 313—184 |
| 3,325,740 | 6/1967 | Froome | 331—127 X |

FOREIGN PATENTS

| | | |
|---|---|---|
| 828,614 | 2/1960 | Great Britain. |

JAMES W. LAWRENCE, *Primary Examiner.*

P. C. DEMEO, *Assistant Examiner.*

U.S. Cl. X.R.

313—111, 113, 114, 184, 220, 231